E. A. BLACK.
VARIABLE SPEED GEARING FOR MOTOR CYCLES.
APPLICATION FILED MAY 9, 1913.
1,139,330.
Patented May 11, 1915.
3 SHEETS—SHEET 1.
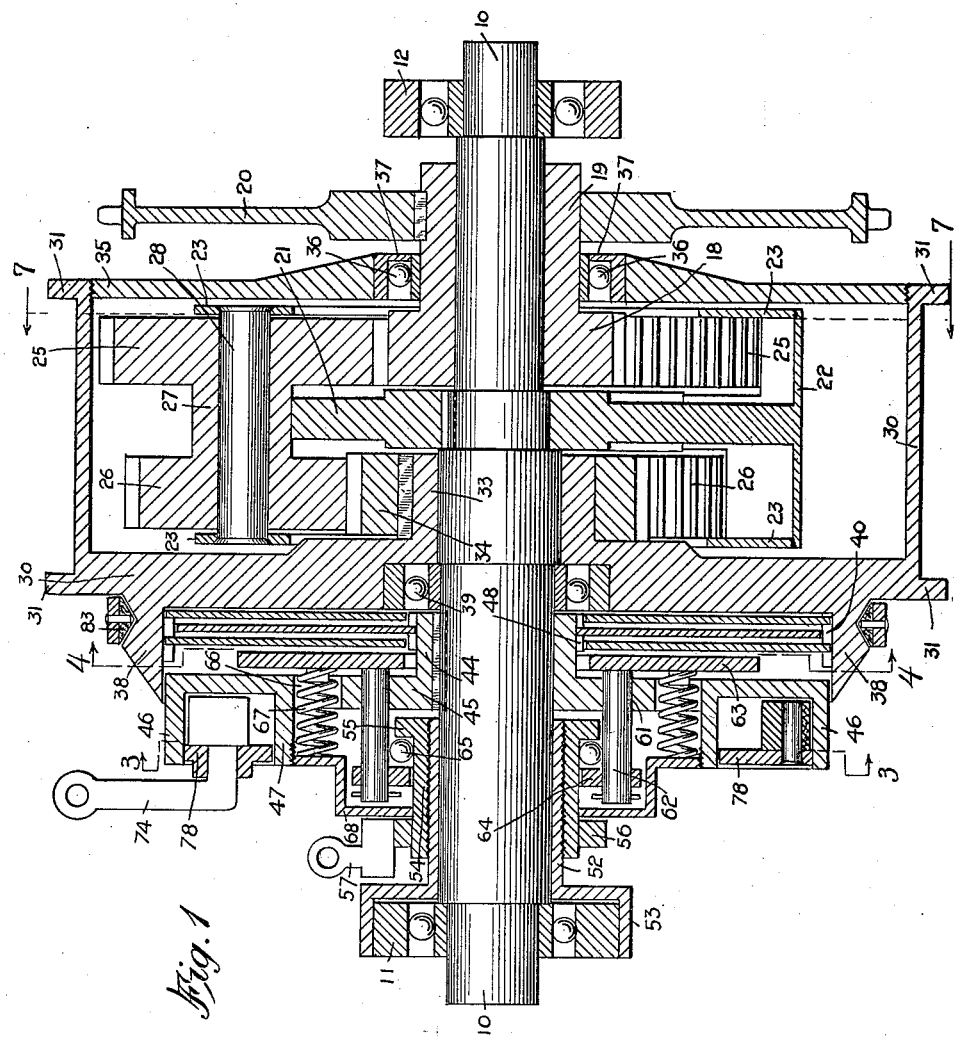
WITNESSES
INVENTOR
Edward A. Black
BY
ATTORNEYS E. A. BLACK.
VARIABLE SPEED GEARING FOR MOTOR CYCLES.
APPLICATION FILED MAY 9, 1913.
1,139,330.
Patented May 11, 1915.
3 SHEETS—SHEET 2.
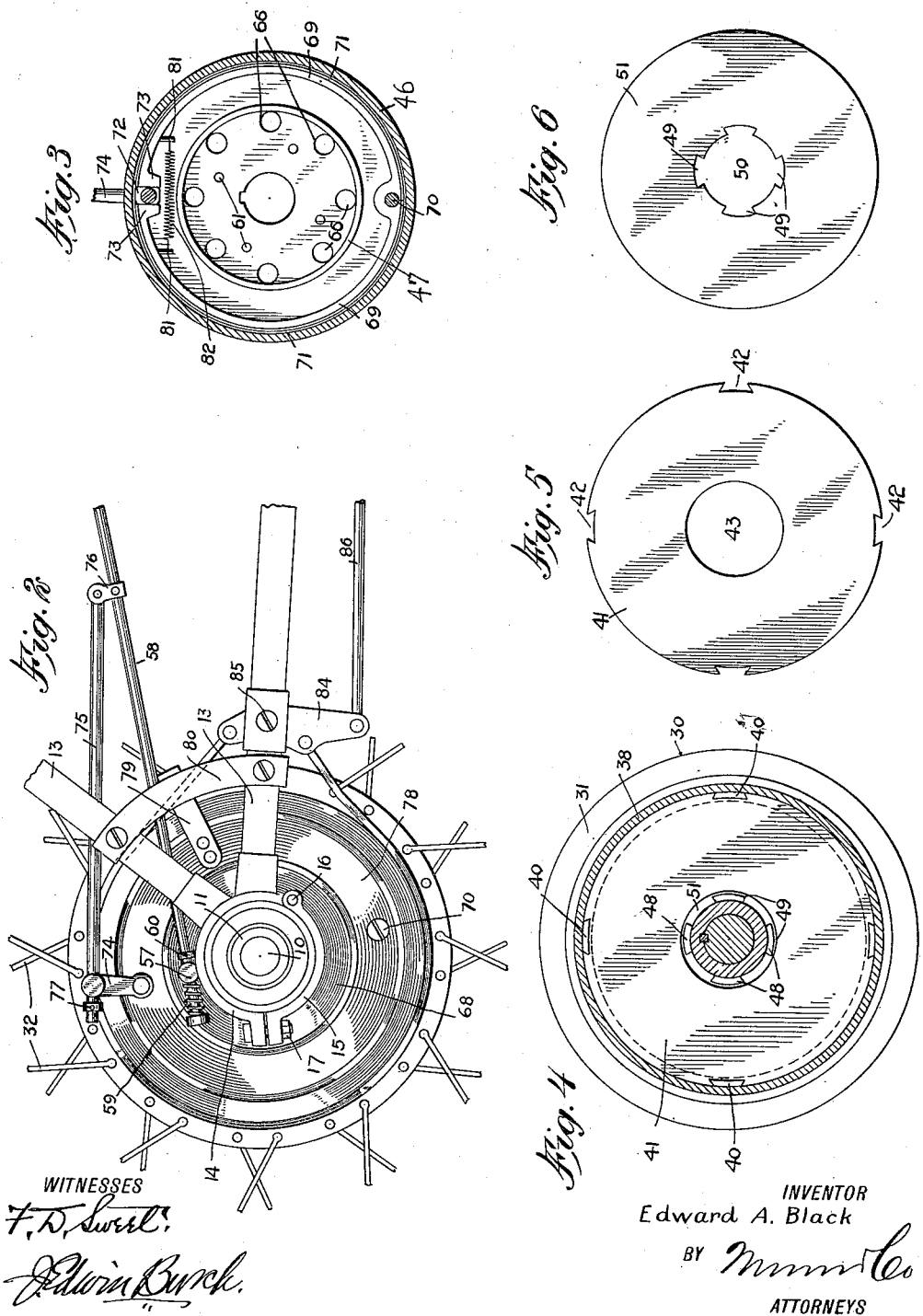
INVENTOR
Edward A. Black
BY
ATTORNEYS

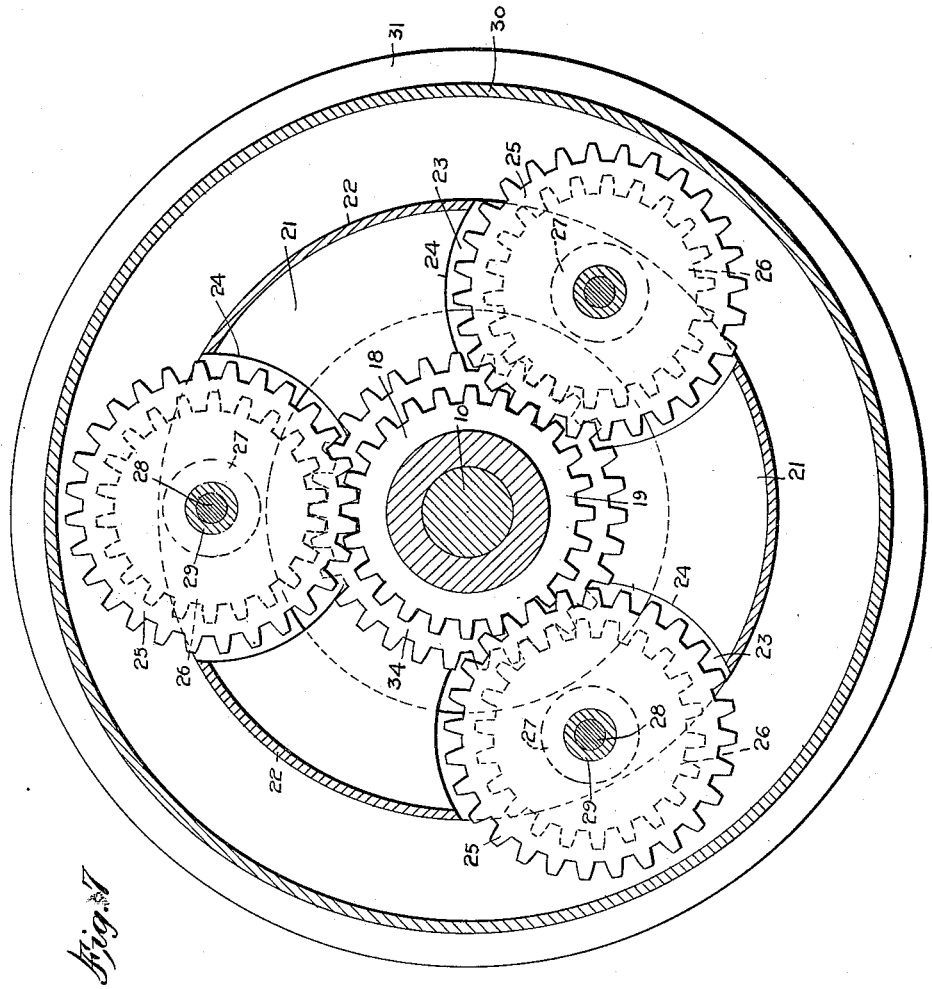

UNITED STATES PATENT OFFICE.

EDWARD A. BLACK, OF PHOENIX, BRITISH COLUMBIA, CANADA.

VARIABLE-SPEED GEARING FOR MOTOR-CYCLES.

1,139,330.  Specification of Letters Patent.  Patented May 11, 1915.

Application filed May 9, 1913. Serial No. 766,588.

*To all whom it may concern:*

Be it known that I, EDWARD A. BLACK, a citizen of the United States of America, and a resident of Phoenix, in the Province of British Columbia, Dominion of Canada, have invented a new and Improved Variable-Speed Gearing for Motor-Cycles, of which the following is a full, clear, and exact description.

This invention relates to improvements in motorcycles and more particularly to an improved variable speed gearing therefor.

The invention has special reference to motorcycles having but one speed and usually termed single speed machines, by which the operator has all the advantages of the high or usual gearing on level roads and of a low gearing on hills or bad roads, and the invention comprehends a novel arrangement of drive parts and controlling means for obtaining the high and low speeds or permitting the engine to run free while the motorcycle is at a state of rest.

With the above and other objects in view, the invention resides more particularly in the peculiar combination and arrangement of parts which will be illustrated as a preferred embodiment in the accompanying drawings and described in the claims.

Reference is to be had to the accompanying drawings forming a part of this specification, in which like characters of reference indicate corresponding parts in all the views, and in which—

Figure 1 is an enlarged vertical sectional view taken through the hub shell and working parts of a drive gearing mounted on the rear axle of the motorcycle; Fig. 2 is a side elevation of said hub shell mounted in the frame of the motorcycle, fragmentary parts of the latter and of the controlling levers for the gearing being shown; Fig. 3 is a sectional view taken on the line 3—3 of Fig. 1, the section being reduced, certain of the parts being omitted; Fig. 4 is a sectional view on the line 4—4 of Fig. 1, on a reduced scale; Fig. 5 is a detail view of one of the clutch plates carried by the hub shell and forming part of a disk clutch comprising part of the drive gearing; Fig. 6 is a similar view of one of the disks or clutch plates carried by the circular casting which is keyed to the axle, such disks and plates forming the coöperating elements of the disk clutch; Fig. 7 is a sectional view taken on the line 7—7 of Fig. 1; and Fig. 8 is a detail face view of a fragmentary portion of the circular casting.

In the illustrated embodiment of the invention, the numeral 10 indicates the rear axle of the motorcycle which is rotatably journaled through the instrumentality of bearings 11 and 12, respectively, in the rear portions or forks of the frame 13, the said frame having cages or open bearings consisting of stationary parts 14 and hinged parts 15 pivoted thereto as shown at 16 to permit convenient mounting and demounting of the axle and drive parts carried thereby, as will be later explained. These hinged parts 15 are held in position to form circular bearings by means of screws or bolts 17 which connect apertured ears of the parts 14 and 15 and serve to permit them to be drawn together in clamping position.

The portions of the axle 10 engaged by the bearings 11 and 12 are of reduced diameter, thus providing shoulders whereby longitudinal shifting of the axle is prevented and threading of the parts of the axle at these points and consequent engagement of retaining nuts thereon, obviated. However, the adjacent portion of the axle at the left-hand end looking toward the rear of the motorcycle is of increased diameter and has journaled thereon a pinion 18, on the sleeve portion 19 of which is fixed or keyed a sprocket wheel 20 adapted for engagement of the usual drive chain from the motor, not shown. Fixed to the axle 10 adjacent to the pinion 18 is a web portion 21 of a cage embodying a rim 22 and removable side flanges or ring-like plates 23 which are threaded into the spaced portions of the web, the latter having a plurality of semi-circular depressions or recesses 24. Rotatably journaled in the plates 23 at the points of location of said recesses are gears embodying pinions 25 disposed normally in mesh with the pinion 18, and smaller pinions 26 spaced from and formed integrally with the pinion 25 through the instrumentality of sleeve portions 27 which are rotatably journaled by means of bushings 28 on axles 29, there being preferably three sets of such gears carried by the plates 23, which together form an epicyclic gearing through which rotation is imparted to the rear wheel. This latter operation is effected and rotation is imparted to the hub shell 30 having peripheral flanges 31 to which the spokes 32 of the rear wheel are connected, the shell in turn being rotatably journaled through the instrumentality of the inwardly extending hub flange 33 on a further enlarged portion of the axle, while keyed or fixed to the hub flange 33 is a pinion or gear 34 which is normally disposed in mesh with the pinions 26. The hub shell 30 is of cup-like form and has its open side normally closed by a plate 35 which is provided with exterior threads engaging interior threads of the peripheral portion of the hub shell, and which is further rotatable on the sleeve portion 19 of the pinion 18 and mounted thereon with interposed bearings 36 to prevent undue friction. This plate 35 is further provided with an exterior flange 37 adjacent to the bearing 36 to prevent the entrance of dust or other foreign matter into the bearings or working parts.

The side of the hub shell opposed to the side at which the plate 35 is disposed is interiorly hollowed out to provide a projection or flange 38 at its peripheral portion, and said hub shell is rotatably journaled on an adjacent portion of the axle 10, which is of reduced diameter relative to the part engaged by the flange 33, as shown at 39 and which engages a shoulder thus provided, so that the web 21, sprocket wheel 20 and the engagement of the bearings 39 against the adjacent parts to the left will hold the hub shell against longitudinal shifting. The interior face of the flange 38 is provided at spaced points with inwardly extending longitudinal ribs 40 by suitable engagement with which spaced disks or clutch plates 41 are removably keyed and adapted to rotate with the hub shell, the said plates 41 having dovetailed recesses or peripheral notches 42 for engaging said ribs and having central openings 43 as shown. Fixed or keyed to the portion of the axle 10 which is rotatably engaged by the bearings 39 through the instrumentality of an inwardly extending hub flange 44, is a circular casting or plate 45, such casting having an outwardly extending peripheral flange 46 and a similarly extending flange 47 spaced interiorly therefrom. The flange 44 is provided with longitudinal ribs 48 which engage in dove-tail recesses or notches 49 communicating with the central opening 50 in clutch plates or disks 51 disposed between the disks 41 or in alternating relation with regard thereto, all of said plates being adapted to be longitudinally displaced and brought into frictional engagement for locking the hub shell and circular casting together for a purpose to be hereinafter made apparent. Also mounted on the axle 10 is a sleeve 52 which has an enlarged portion 53 held stationary in one of the cages constituted by the parts 14 and 15, and this sleeve 52 is provided with quick-acting or coarse-pitch exterior threads on which is engaged an interiorly threaded sleeve 54, the latter having a radially extending flange 55 at its inner end and a removable flange 56 at its outer end. The flange 56 has an apertured arm 57 through which an operating rod 58 is slidable, there being a coiled spring 59 engaged on the rod between the enlargement at the extremity thereof and the arm and a set collar 60 fixed to the rod to limit its rearward displacement, while the spring permits a limited forward displacement of the rod during the initial compression of the spring, before the arm 57 and its attached sleeve are rotated. The circular casting 45 is provided with a plurality of openings 61, preferably four in number, and through which extend rods 62 carried by a disk 63 and extending outwardly from the latter and in the direction of the length of or parallel with respect to the axle, said disk 63 being movably mounted between the clutch plates or disks and the circular casting and having a central opening the same as the disks 41, whereby it will clear the ribs 48 carried by the sleeve portion.

A bearing ring 64 is mounted on the sleeve 54 between the flanges 55 and 56 and is movably carried by the rods 62, and ball bearings 65 are mounted on the sleeve 54 outwardly of the flange 55 and between said flange and the ring 64, so that by oscillating the arm 57, the sleeve 54 by its threaded engagement with the fixed sleeve 52 will be shifted longitudinally. The utility of this construction is made apparent owing to the fact that the casting 45 is further provided with openings 66, outwardly of the openings 61, through which coiled springs 67 are disposed, said springs being fixed to the shifting disk 63 and having their outer ends contacting with the smooth interior face of a compression ring 68. This compression ring is threaded into the flange 47 and is adjustable to vary the tensions of the springs and forcible engagement of the clutch plates under the action of the same, as well as to compensate for wear of such plates. It will be observed that the compression ring is of angular form, the same overlying the rods 62, bearing ring 64 and bearings 65, whereby it will also serve to exclude dust from the interior parts. Thus, the springs 67 will serve to normally hold the clutch plates in locking engagement, and in this position the flange 55 will be inwardly displaced with the sleeve 54, but when it is desired to disengage the plates to unlock the clutch, the sleeve is partially rotated by shifting the rod 58, thus exerting outward pull on the rods 62 by engagement of the flange 55 with the ring 64 through the intermediate bearings 65, this action taking place against the tension of the springs 67. There are preferably eight of such springs 67 in order to exert a more even pressure than with a lesser number, and also to allow the use of weaker springs which results in a smoother operation.

Mounted between the flanges 46 and 47 is a sectional clutch band embodying the sections 69 pivoted as shown at 70 and provided with a covering of asbestos and interwoven brass wire as shown at 71, such covering forming a friction gripping surface adapted to engage the interior surface of the flange 46 to hold the circular casting 45 stationary. This is effected by the operation of a cam 72 between the enlarged extremities 73 of the clutch band sections 69, said cam having an angular arm or lever 74 rigid therewith, the arm being apertured for engagement by a rod 75 which is in turn connected to the rod 58, as shown at 76, and which is movable through the aperture of the arm or lever 74 to a limited extent without shifting the same, until the engagement of a set collar 77 carried by the rod 75 with the arm or lever 74. When this motion is effected to oscillate the lever 74 the cam 72 will be turned to spread the sections of the band clutch and in this way hold the circular casting against rotation.

The angular arm or lever 74 is rotatably mounted through a circular plate 78 which is held stationary by means of a radial arm 79 carried by an arcuate plate 80 connecting the frame portions 13, and thus it will be seen that the axle which is keyed to the circular casting 45 will also be held stationary. In order to hold the clutch band inoperative, the sections 69 thereof, adjacent to their free extremities, are provided with lugs 81 connected by means of a contractile or normally contracted spring 82 which, when the cam 72 is moved to an inoperative position, will hold the enlargements 72 of the band sections normally in contact with the cam and the band sections out of frictional engagement with the inner face of the flange 46.

The peripheral face of the flange 38 adjacent to the hub shell is provided with a groove in which a band brake 83 is seated, the same consisting of a metal band having a lining of asbestos and brass wire woven together and having its extremities connected to a rocking lever 84 pivoted as shown at 85 to the frame of the motorcycle, and operated by a rod 86, it being understood that all of said parts may be conveniently manipulated in any preferred manner from the handle bars of the machine, or the pedals.

The operation of the device is as follows:

*Free engine position.*—As before described, the sprocket wheel 20 takes the drive directly from the motor and the axle 10 operates in the ball bearings 11 and 12. However, inasmuch as the sprocket wheel is keyed to the shank gear 18, rotation would be imparted to the pinion 34 through the pinions 25 and 26 to rotate the rear wheel through the hub shell 30 were the pinion 34 free to rotate, it being understood that the device forms the hub of the rear wheel of the motorcycle. As heretofore described, the springs 67 are normally in position to lock the clutch plates 41 and 51 so that when the lever or arm 57 is shifted in one direction the springs 67 will be compressed to unlock the clutch plates and the drive is then through the gears as described, but since the gear or pinion 34 is held stationary by the hub shell, which in turn is held by the friction of the wheel on the ground, the result is that the pinion or gear 18 runs forward while the gears or pinions 25 and 26, complete with the cage in which they are mounted, and the circular casting 45 together with the parts secured to it and the axle 10, revolve backwardly.

*Low speed.*—This operation depends upon the shifting of the rods 58 and 75 which operate as one, so that when the rod 58 is partly advanced the rod operating the lever 74, that is, the rod 75, will slide through the lever 74 and will not move it until the projection on the end of the rod comes in contact with the arm. However, since the lever 57 has been advanced its limit, the device is now in free engine position, but when the rod operating the arm 57 is advanced farther, owing to the presence of the coiled spring 59 on the rod, the lever 74 will be advanced to spread the band clutch by operation of the cam 72 so that the axle will be locked solid. In this position the drive will be through the shank pinion 18, pinions 25 and 26 and thence to the hub shell through the pinion 34, which revolves the hub shell at a reduction of 40% from engine speed, so that the low speed is produced.

*High speed.*—In this position the clutch plates are locked so that the circular casting and hub shell revolve as one, the hub shell being locked solid to the axle, and in this position these parts revolve as a unit. It is, of course, understood that the plate 78 is stationary at all times and with the band clutch normally released by the spring 82 the drive is then directly through the axle and clutch plates to the hub shell, thus increasing the speed of rotation of the rear wheel. When it is desired to bring the motorcycle to a stop the rod 86 is operated to rock the lever 84 on its pivot 85, thus tightening the band brake 83 which, due to its frictional contact with the face of the groove formed in the flange 38, will bring the wheel to a state of rest.

Having thus described my invention, what I claim as new and desire to secure by Letters Patent is:—

1. The combination with the rear axle of a motorcycle and open bearings rotatably supporting the same; of a hub shell journaled on the axle and having a removable portion, a cage having a web portion keyed on the axle within the hub shell, a shank gear journaled on the axle and adapted to be suitably driven, a pinion fixed to the hub shell interiorly, means for holding the axle stationary, sets of pinions carried by the cage and being of different diameters, said pinions last mentioned being disposed in mesh with the shank gear and pinion fixed to the shell, respectively, to drive the latter at reduced speed when the axle is held stationary, and means for locking the shell to the axle.

2. The combination with the rear axle and frame of a motorcycle and open bearings rotatably supporting the same; of a hub shell journaled on the axle and having a removable portion, a cage having a web portion fixed on the axle within the hub shell, a shank gear journaled on the axle and adapted to be suitably driven, a pinion fixed to the hub shell interiorly, sets of pinions carried by the cage and being of different diameters, said pinions last mentioned being disposed in mesh with the shank gear and pinion fixed to the shell, respectively, to drive the latter at reduced speed, a sleeve fixed to one of the bearings and having a threaded portion, a stationary element carried by the frame, a circular casting fixed to the axle, means to lock the casting to the stationary element, coöperating clutch elements carried by the hub shell and casting, and a sleeve operating on the first-mentioned sleeve to move the clutch elements into and out of operative position.

3. The combination with the rear axle and frame of a motorcycle and open bearings rotatably supporting the same; of a hub shell journaled on the axle and having a removable portion, a cage having a web portion fixed on the axle within the hub shell, a suitably driven shank gear journaled on the axle, a pinion fixed to the hub shell interiorly, sets of pinions carried by the cage and being of different diameters, said pinions last mentioned being disposed in mesh with the shank gear and pinion fixed to the shell, respectively, to drive the latter at reduced speed, a sleeve fixed to one of the bearings and having a threaded portion, a stationary element carried by the frame, a circular casting fixed to the axle, means coöperating with the stationary element and the casting to hold the axle stationary, coöperating clutch elements carried by the hub shell and casting, said clutch elements being normally locked, a shifting plate for said clutch elements and having rods operating through the circular casting, an operating ring carried by the rods, and a sleeve operating on the first-mentioned sleeve and provided with a flanged portion adapted to engage the operating ring to unlock the clutch elements.

4. The combination with the rear axle and frame of a motorcycle and open bearings rotatably supporting the same; of a hub shell journaled on the axle and having a removable portion, a cage having a web portion keyed on the axle within the hub shell, a suitably driven shank gear journaled on the axle, a pinion fixed to the hub shell interiorly, sets of pinions carried by the cage and being of different diameters, said pinions last mentioned being disposed in mesh with the shank gear and pinion fixed to the shell, respectively, to drive the latter at reduced speed, a sleeve fixed to one of the bearings and having a threaded portion, a stationary element carried by the frame, a circular casting fixed to the axle, clutch means to lock the stationary element and casting together to hold the axle stationary, coöperating clutch elements carried by the hub shell and casting, a sleeve operating on the first-mentioned sleeve to move the clutch elements out of operative position, resilient means causing frictional gripping action between the clutch elements, and a compression ring adjustably engaged with the circular casting to vary the frictional gripping action of the clutch elements.

5. A drive mechanism for motorcycles, embodying a hub shell, an axle on which said shell is journaled, suitably driven means journaled in the shell and on the axle constituting a low speed gearing for rotating the shell, said means being adapted at times to rotate with the axle, said hub shell being provided with a lateral flange having interior longitudinal ribs, clutch plates slidable on the ribs, a circular casting having a sleeve portion keyed to the axle, said sleeve portion having exterior longitudinal ribs, clutch plates slidable on the ribs, said circular casting also having a plurality of openings therethrough arranged in spaced relation in two concentric series, a clutch operating plate having rods extending through the openings of one series and adapted to be shifted longitudinally with respect to the casting, a compression ring operating in the casting, springs engaged through the other series of openings and positioned between the clutch operating plate and the compression ring to hold the clutch plates in one position, said compression ring serving to move the clutch plates in an opposite position, said circular casting having spaced outwardly extending flanges, stationary plates carried by the frame and disposed between said flanges, a cam operated band clutch and means connected to the frame for operating the clutch to lock the casting and its axle to the frame while the hub shell is rotating independently thereof to produce a low speed gear.

6. In a variable speed gearing for motorcycles, the combination with a drive axle and hub shell journaled thereon; of a sprocket journaled on the axle and adapted to receive rotation, a gearing between the hub shell and sprocket for driving the hub shell at a reduced speed, an adjustable spring actuated plate clutch locking the axle to the hub shell whereby the latter will be rotated, means for adjusting the degree of movement of said locking means, and a stationary member carried by the frame of the motorcycle to be locked to the shell and locking means to hold the hub shell against movement so as to permit the gearing to rotate independent of the hub shell, said means being operable from a common operating member with the clutch.

7. A drive mechanism for motorcycles, embodying a hub shell, an axle on which said hub shell is journaled, means journaled in the shell on the axle constituting a low speed gearing for rotating the shell, said hub shell being provided with a lateral flange having interior longitudinal ribs, clutch plates slidable on the ribs, a circular casting having a sleeve portion keyed to the axle, said sleeve portion having exterior longitudinal ribs, clutch plates slidable on the ribs last mentioned, said circular casting also having a plurality of openings therethrough, a clutch operating plate having rods extending through certain of said openings in the circular casting and adapted to be shifted longitudinally, springs carried by the clutch operating plate, a compression ring operating in the casting and engaged by the springs whereby the latter will normally engage the clutch plates to lock the same, and lever-operated means carried by the motorcycle for unlocking the plates through the medium of said rods.

8. A drive mechanism for motorcycles, embodying a hub shell, an axle on which said shell is journaled, suitably driven means journaled in the shell and on the axle constituting a low speed gearing for rotating the shell, said hub shell being provided with a lateral flange, clutch plates fitting in the flange for longitudinal movement and held against rotation independent of the shell, a circular casting having a sleeve portion keyed to the axle, clutch plates mounted on the sleeve for longitudinal movement but held from rotation, said circular casting also having a plurality of openings therethrough, a clutch operating plate having rods extending through certain of said openings and adapted to be shifted longitudinally, springs engaging the clutch operating plate, a compression ring operating in the casting and engaged by the springs whereby the latter will normally force the clutch plates together to connect the shell and axle for simultaneous rotation, and lever operated means carried by the motorcycle for unlocking the plates through the medium of said rods.

9. A drive mechanism for motorcycles, embodying a hub shell forming a part of the rear wheel thereof, an axle on which said shell is journaled, means carried by the axle and adapted to be driven independently of the shell for transmitting rotation to the latter, said shell being provided with a lateral flange having interior longitudinal ribs, clutch plates slidable on the ribs, a circular casting having a sleeve portion keyed to the axle, said sleeve portion having exterior longitudinal ribs, clutch plates slidable on the ribs, said circular casting also having a plurality of openings therethrough at spaced points concentric to the center of the plates, a clutch operating plate having rods extending through certain of said openings and adapted to be shifted longitudinally, a compression ring operating in the casting and moving longitudinally with respect thereto, spring means between the compression ring and casting to normally hold the clutch plates in frictional engagement, a frame, a sleeve held stationary by the frame and having a threaded portion, a second sleeve adjustable thereon and having an interior flange, a ring carried by the rods and movable thereon, ball bearings between the flange and ring, means for oscillating the sleeve having the flange whereby the clutch operating plate will be moved outwardly against the action of the spring means by engagement of the flange with the ring through the bearings, and means for locking the circular casting to the frame to hold the casting stationary whereby the axle is held from rotation and the hub shell caused to revolve slower than the engine speed.

10. A drive mechanism for motorcycles, embodying the combination of the frame, a hub shell of one of the drive wheels thereof and an axle on which said hub shell is journaled; of means carried by the axle and partially supporting the shell for rotation thereon for assisting in transmitting motion to the axle, clutch plates carried by the shell and held against rotation independently thereof and adapted for longitudinal movement with respect thereto, a part fixed to the axle, clutch plates mounted thereon and held against rotation independently thereof and adapted for longitudinal movement, means normally tending to lock the plates together, means for regulating the action of said last-mentioned means, a sleeve held stationary by the frame and having a threaded portion, a second sleve adjustable thereon and having an interior flange, a ring slidable on the sleeve and adapted to engage the flange, and means for oscillating the sleeve having the flange whereby the clutch operating means will be moved outwardly against its operating means by forcible engagement of the flange with the ring.

11. A drive mechanism for motorcycles, embodying in combination a rear drive axle, a hub shell journaled thereon and forming a part of the rear wheel, a motor driven train of gearing supported by the axle and mounted within the shell to normally rotate independently of the latter on the axle and shell but adapted at times to rotate with the axle for driving the wheel, means to connect the shell and axle to cause the shell to be directly driven from the axle, means to hold the axle against rotation independently of the shell to cause the shell to be driven through the train of gearing, and means for releasing said connecting means between the axle and shell to cause the gears to rotate independently of the axle and shell, said shell being held against movement by the frictional contact of its wheel on the ground.

In testimony whereof I have signed my name to this specification in the presence of two subscribing witnesses.

EDWARD A. BLACK.

Witnesses:
D. J. MATHESON,
NELLIE INGRAM.

Copies of this patent may be obtained for five cents each, by addressing the "Commissioner of Patents, Washington, D. C."